United States Patent
Fukunaga

(10) Patent No.: US 9,879,766 B2
(45) Date of Patent: Jan. 30, 2018

(54) ROTARY TRANSMITTING ASSEMBLY, DEVICE FOR CONVERTING ROTARY MOTION TO LINEAR MOTION, AND MOTOR

(71) Applicant: NIDEC CORPORATION, Minami-ku, Tokyo (JP)

(72) Inventor: Keisuke Fukunaga, Minami-ku (JP)

(73) Assignee: NIDEC CORPORATION, Minami-Ku, Kyoto (JP)

( * ) Notice: Subject to any disclaimer, the term of this patent is extended or adjusted under 35 U.S.C. 154(b) by 0 days.

(21) Appl. No.: 14/932,430

(22) Filed: Nov. 4, 2015

(65) Prior Publication Data

US 2016/0319922 A1     Nov. 3, 2016

Related U.S. Application Data

(60) Provisional application No. 62/153,678, filed on Apr. 28, 2015.

(51) Int. Cl.
*F16H 25/22*     (2006.01)
*F16C 19/16*     (2006.01)
(Continued)

(52) U.S. Cl.
CPC ....... *F16H 25/2204* (2013.01); *F16C 33/723* (2013.01); *F16C 35/073* (2013.01);
(Continued)

(58) Field of Classification Search
CPC .... F16C 33/723; F16C 35/073; F16C 19/166; F16C 35/077; F16C 35/067; F16C 35/07;
(Continued)

(56) References Cited

U.S. PATENT DOCUMENTS

| 5,865,290 A | * | 2/1999 | Scott | ....................... | B65G 39/12 |
| | | | | | 193/37 |
| 6,123,167 A | | 9/2000 | Miller et al. | | |

(Continued)

FOREIGN PATENT DOCUMENTS

| JP | 07284247 A | | 10/1995 | | |
| JP | 2000034009 A | * | 2/2000 | ............. | B65G 39/12 |

(Continued)

*Primary Examiner* — Terence Boes
*Assistant Examiner* — Bobby Rushing, Jr.
(74) *Attorney, Agent, or Firm* — Cantor Colburn LLP

(57) ABSTRACT

A rotary transmitting assembly may include a housing having a bearing surface sustaining a bearing; a hollow shaft coupled to the housing, wherein the hollow shaft has an outer circumferential stepped shaft portion and an inner circumferential stepped shaft portion; a rod member coupled to the housing and having a contacting portion and a protruding part, wherein the contacting portion contacts a part of the hollow shaft and the protruding part abuts the inner circumferential stepped shaft portion. The bearing may include a circular inner support part and a circular outer support part supporting the hollow shaft and the rod member, wherein the circular inner support part abuts the outer circumferential stepped shaft portion and the circular outer support part abuts the bearing surface of the housing. A stopper member may be fixed to the rod member, wherein the stopper member abuts the circular inner support part.

17 Claims, 2 Drawing Sheets

(51) Int. Cl.
*F16C 35/073* (2006.01)
*F16C 35/077* (2006.01)
*F16C 35/12* (2006.01)
*F16C 35/063* (2006.01)
*F16C 35/067* (2006.01)
*F16C 33/72* (2006.01)
*F16C 35/07* (2006.01)

(52) U.S. Cl.
CPC ............ *F16H 25/22* (2013.01); *F16C 19/166* (2013.01); *F16C 35/067* (2013.01); *F16C 35/07* (2013.01)

(58) Field of Classification Search
CPC ........ F16C 35/063; F16C 35/12; F16H 25/22; F16H 25/2204
USPC ..... 74/89.23, 127, 424.71, 424.81; 188/71.1, 188/72.7, 72.8; 384/295
See application file for complete search history.

(56) References Cited

U.S. PATENT DOCUMENTS

| | | | |
|---|---|---|---|
| 6,349,801 B1* | 2/2002 | Koth | F16D 65/18 188/72.8 |
| 8,893,847 B2* | 11/2014 | Imanishi | B62D 5/0409 180/443 |
| 9,157,507 B2* | 10/2015 | Zimmermann | F16H 1/125 |
| 2001/0045784 A1 | 11/2001 | Niimi et al. | |
| 2006/0169548 A1* | 8/2006 | Corbett | F16D 28/00 188/72.8 |

FOREIGN PATENT DOCUMENTS

| | | | | |
|---|---|---|---|---|
| JP | 2001150146 A | | 6/2001 | |
| JP | 2002520545 A | | 7/2002 | |
| JP | 2006071009 A | | 3/2006 | |
| JP | 2006311654 A | | 11/2006 | |
| JP | 2007071381 A | * | 3/2007 | ............ F16C 27/066 |
| JP | 2008245347 A | | 10/2008 | |

* cited by examiner

ROTARY TRANSMITTING ASSEMBLY, DEVICE FOR CONVERTING ROTARY MOTION TO LINEAR MOTION, AND MOTOR

CROSS REFERENCE TO RELATED APPLICATIONS

The present invention claims priority under 35 U.S.C. § 119(e) to U.S. Application No. 62/153,678 filed Apr. 28, 2015, the entire content of which is incorporated herein by reference.

BACKGROUND OF THE INVENTION

At least an embodiment of the present invention generally relates to a rotary transmitting assembly, a device for converting rotary motion to linear motion, and a motor. More specifically, at least an embodiment of the present invention relates to a rotary transmitting assembly, a device for converting rotary motion to linear motion, and a motor that provide a secure positioning of axially and radially loaded components thereof in an axial and radial direction.

A known type of a device for converting rotary motion of a motor into linear motion includes a conventional ball nut for transmitting the rotary motion of a rod member to a linear motion, wherein the ball nut is movably arranged on the rod member. Since the ball nut is moved back and forth on the rod member, the bearings for supporting the rod member with respect to a housing are under high axial and radial load.

One example of a device for converting rotary motion into linear motion is disclosed in JPB4722247. However, JPB4722247 discloses a conventional bearing arrangement for rotatably supporting the rotational portion on the stationary portion (i.e., housing), wherein the components for supporting the rotational portion to the stationary portion are easy to come off under high axial and radial load.

An object of the invention is to increase the secure positioning of loaded components in a rotary transmitting assembly in an axial and radial direction. A further object of the invention is to reduce the axial runout. An even further object of the invention is to prevent rod member movement in the axial direction with a rotary transmitting assembly.

In view of the state of the known technology and in accordance with a first embodiment of the present invention, a rotary transmitting assembly is provided that basically comprises a housing, a hollow shaft, a rod member, at least one bearing, and a stopper member. The hollow shaft is coupled to the housing rotatably around a first rotation axis. The hollow shaft has at least one outer circumferential stepped shaft portion and at least one inner circumferential stepped shaft portion. The rod member is coupled to the housing rotatably around the first rotation axis having at least one contacting portion and at least one protruding part. The at least one contacting portion contacts the at least a part of the hollow shaft in a radial direction and the at least one protruding part abuts the at least one inner circumferential stepped shaft portion in an axial direction. The at least two contact points, although preferably closely arranged to each other, but also can be arranged apart from each other. The at least one bearing comprises at least one circular inner support part and at least one circular outer support part supporting the hollow shaft and the rod member to the housing rotatably around the first rotation axis. The at least one circular inner support part abuts at least a part of the at least one outer circumferential stepped shaft portion in the axial direction and the at least one circular outer support part abuts a bearing surface of the housing in the axial direction. The stopper member is fixed to the rod member, wherein the stopper member abuts the at least one circular inner support part in the axial direction.

Because the stopper member receives the at least one circular inner support parts of the bearing and the at least one outer circumferential stepped shaft portion receives the other one of the circular inner support parts of the bearing, the axial runout is reduced. This axially fixing arrangement further enables that rod member movement in an axial direction is prevented.

Preferably, the rotary transmitting assembly further comprises a circular bearing holding member fixed to an inner surface of an opening portion of the housing and configured to abut at least a part of the at least one circular outer support part in the axial direction. This further enables a secure fixture and positioning of the bearing in an axial direction.

Preferably, the rotary transmitting assembly is configured so that an outer diameter of the circular bearing holding member is larger than an outer diameter of the at least one circular outer support part in a radial direction. This enables a secure fixture and positioning of the bearing in an axial direction.

Preferably, the rotary transmitting assembly is configured so that the circular bearing holding member comprises at least one sealing element. This enables secure sealing.

Preferably, the rotary transmitting assembly is configured so that the circular bearing holding member is securely fixed to the inner surface of the opening portion of the housing, in particular at least one part of the circular bearing holding member is swaged to at least one part of the opening portion and a deformed portion is formed. Therefore, the circular bearing holding member securely locks the bearing.

Preferably, the rotary transmitting assembly is configured so that the circular bearing holding member has a concave portion on an upper surface of the circular bearing holding member and a convex portion on a lower surface of the circular bearing holding member, wherein the concave portion has a tool engaging hole, and wherein the convex portion on the lower surface of the circular bearing holding member is arranged in the deeper area than the deformed portion in the axial direction. This arrangement enables that the stress from the swag/deformation can escape to the convex portion of the circular bearing holding member. With this structure, the circular bearing holding member is securely fixed to the housing. This structure is an effective bearing fixing assembly. Since the circular bearing holding member can be threadedly engaged with the inner surface of the opening portion of the housing and/or swaged to at least one part of the opening portion forming the deformed portion, this structure has a high flexibility to dimension tolerances of the bearing and/or the housing.

Preferably, the rotary transmitting assembly is configured so that the housing has at least one stepped housing section, wherein the at least one bearing is arranged in the manner where an axial end surface of the at least one bearing is positioned between the outer surface of the at least one stepped housing section and the inner surface of the at least one stepped housing section. With this structure, a sufficient thickness of the housing is provided for securing the bearing in a radial direction.

Preferably, the rotary transmitting assembly is configured so that the at least one bearing is a four-point contact bearing, wherein the circular inner support part has a lower inner support part and an upper inner support part, wherein the lower inner support part abuts the at least one outer circumferential stepped shaft portion and the upper inner support part abuts the stopper member. Because the stopper member receives the upper inner support part of the bearing and the at least one outer circumferential stepped shaft portion receives lower inner support part of the bearing, the axial runout is reduced. This axial locking arrangement further enables that rod member movement in an axial direction is prevented. The circular outer support part may also comprise two separate support parts, i.e., an upper outer support part and a lower outer support part.

Preferably, the rotary transmitting assembly is configured so that at least one portion of the hollow shaft corresponds to the shape of the at least one contacting portion of the rod member, wherein the at least one contacting portion of the rod member may have a shape different to a circular shape, in particular, the at least one contacting portion of the rod member may has at least either one of a polygonal shape, an ellipse shape, and a shape with a concave section and/or convex section. This rotation transmitting structure conveys the rotation of the hollow shaft to the rod member.

In accordance with another embodiment of the present invention, a device for converting rotary motion to linear motion is provided that basically comprises a housing, a stator, a hollow shaft, a plurality of magnets, a rod member, at least one bearing, a stopper member, and a ball nut. The stator with a plurality of coils is arranged in a circumferential direction, wherein the stator is disposed on a cylindrical portion of the housing. The hollow shaft is coupled to the housing rotatably around a first rotation axis, wherein the hollow shaft has at least one outer circumferential stepped shaft portion and at least one inner circumferential stepped shaft portion. A plurality of magnets is disposed on a circumferential outer surface of the hollow shaft inwardly from the stator in a radial direction. The rod member is coupled to the housing rotatably around the first rotation axis having at least one contacting portion and at least one protruding part, wherein the at least one contacting portion contacts at least a part of the hollow shaft in a radial direction and the at least one protruding part abuts the at least one inner circumferential stepped shaft portion in an axial direction. The at least one bearing comprises at least one circular inner support part and at least one circular outer support part supporting the hollow shaft and the rod member to the housing rotatably around the first rotation axis. The at least one circular inner support part abuts the at least a part of the at least one outer circumferential stepped shaft portion in the axial direction and the at least one circular outer support part abuts a bearing surface of the housing in the axial direction. The stopper member is fixed to the rod member, wherein the stopper member abuts the at least one circular inner support part in the axial direction. The ball nut is rotatably supported on spiral grooves on an outer circumferential periphery of the rod member, wherein the ball nut moves in the axial direction of the first rotation axis in accordance with rotation of the rod member.

The ball nut moves back and forth in an axial direction, thus, the bearing is under a high load in the axial direction of the rod member. Because the stopper member receives one of the circular inner support parts of the bearing and the at least one outer circumferential stepped shaft portion receives the other one of the circular inner support parts of the bearing, the axial runout is reduced. This axial locking arrangement further enables that rod member movement in an axial direction is prevented.

In accordance with another embodiment of the present invention, a motor is provided that basically comprises a device for converting rotary motion to linear motion according to one of the above embodiments of the invention. This motor can achieve enough strength against the force of the hollow shaft and rod member in both radial and axial direction.

Preferably, the motor is configured so that the motor is formed as a braking system motor. In a braking system, this motor is used to change pressure of a brake booster that the ball nut is mounted to. And the smooth and quick change of pressure is required for safe and comfortable ride. Then the ball nut is required to be able to move back and force with good response and the bearing is under specially high pressure in an axial direction due to such movement.

The advantages of at least an embodiment of the present invention can be summarized as follows:
 a. The stability of fixation and positioning of loaded components is increased in an axial and radial direction.
 b. The axial runout is reduced.
 c. The rod member movement in the axial direction is prevented.

Further advantages that can be obtained with embodiments can be summarized as follows:
 a. The circular bearing holding member securely locks the bearing. This structure is an effective bearing fixing assembly.
 b. The structure has a high flexibility in the standpoint of dimension tolerances of the bearing and/or the housing.
 c. Sufficient thickness of the housing is provided for sustaining the bearing in a radial direction.
 d. The rotation transmitting structure conveys the rotation of the hollow shaft to the rod member.
 e. The motor can achieve enough strength against the force of the hollow shaft and rod member in both radial and axial direction.

Also other objects, features, aspects and advantages of the disclosed rotary transmitting assembly, the device converting rotary motion to linear motion, and the motor will become apparent to those skilled in the art from the following detailed description.

BRIEF DESCRIPTION OF THE DRAWINGS

It will be understood that the embodiments and aspects of the invention described in the FIGs. are only examples and do not limit the protective scope of the claims in any way. The invention is defined by the claims and their equivalents. It will be understood that features of one aspect or embodiment can be combined with a feature of a different aspect or aspects of other embodiments. Embodiments will now be described, by way of example only, with reference to the accompanying drawings which are meant to be exemplary, not limiting, and wherein like elements are numbered alike in several Figures, in which:

DETAILED DESCRIPTION

At least an embodiment of the present invention is fully described below using examples for the purpose of disclosure, without limiting the disclosure to the examples. The examples present different embodiments of the present invention. To implement the present technical teaching, it is not required to implement all of these aspects combined. Rather, a person skilled in the art will select and combine those aspects that appear sensible and required for the corresponding application and implementation.

Figure 1:
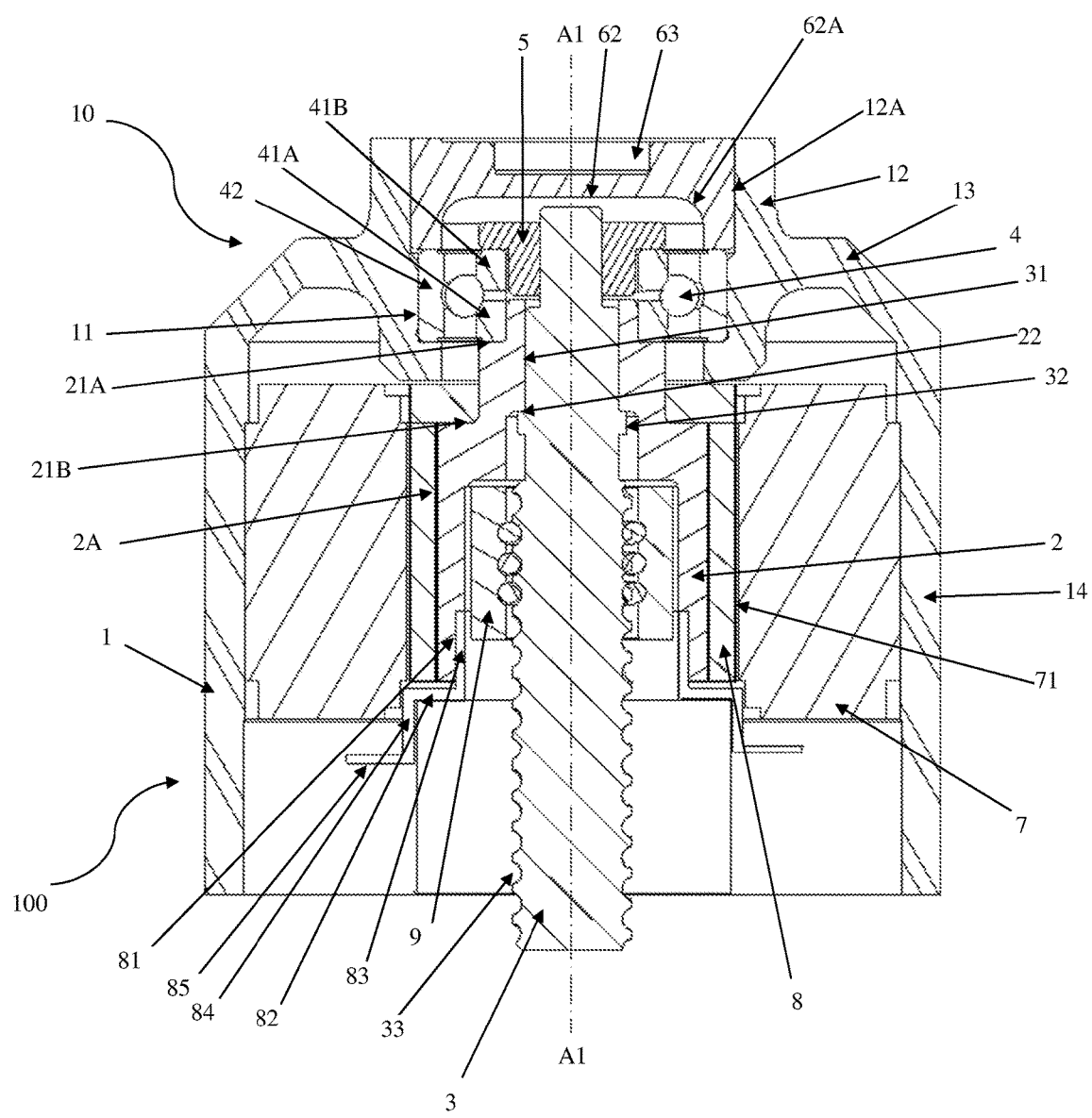
FIG. 1 is a cross sectional view of a rotary transmitting assembly in accordance with a first embodiment, as well of a device for converting rotary motion to linear motion in accordance with a second embodiment.

Referring initially to FIG. 1, a rotary transmitting assembly 10 in accordance with a first embodiment is illustrated. The rotary transmitting assembly 10 comprises a housing 1, a hollow shaft 2, a rod member 3, at least one bearing 4, and a stopper member 5. The hollow shaft 2 is coupled to the housing 1 rotatably around a first rotation axis A1 (i.e., rod member axle). The hollow shaft 2 shown herein, has two outer circumferential stepped shaft portions, in particular a first outer circumferential stepped shaft portion 21A and a second outer circumferential stepped shaft portion 21B. While the hollow shaft 2 illustrated has two outer circumferential stepped shaft portions 21A, 21B, the hollow shaft 2 can have more than or less than two outer circumferential stepped shaft portions 21A, 21B as needed and/or desired. The hollow shaft 2 shown herein, has further one inner circumferential stepped shaft portion 22. While the hollow shaft 2 illustrated has one inner circumferential stepped shaft portion 22, the hollow shaft 2 can have more than or less than one inner circumferential stepped shaft portion 22 as needed and/or desired.

As seen in FIG. 1, the rod member 3 (e.g., a solid shaft) is coupled to the housing 1 rotatably around the first rotation axis A1. The rod member 3 has at least one contacting portion 31, which is circumferentially formed on an outer circumferential surface of the rod member, and which extends on the outer circumferential surface of the rod member 3 in an axial direction with respect to the first rotation axis A1. While the rod member 3 illustrated has only one contacting portion 31, the rod member 3 can have more than one contacting portion 31, as needed and/or desired. The rod member 3 further has a protruding part 32, which extends from the outer circumferential surface of the rod member 3 in a radial direction with respect to the first rotation axis A1. While the rod member 3 illustrated has only one protruding part 32, the rod member 3 can have more than one protruding part 32 and such protruding part 32 can be formed in an annular shape or more than one protruding part 32 can be located on the rod member 3 in a circumferential direction with respect to the first rotation axis A1, as needed and/or desired. The contacting portion 31 contacts at least a part of the hollow shaft (2) in a radial direction and the protruding part 32 abuts the inner circumferential stepped shaft portion 22 of the hollow shaft 2 in an axial direction, respectively. Thus, the rod member 3 and the hollow shaft 2 are operatively coupled to each other for rotating as a single unitary member. The rod member 3 and the hollow shaft 2 are fixed to each other, for example, by means of a friction connection or positive-locking connection, as shown in the following (FIGS. 3A-3D). Accordingly, the contacting portion 31 of the rod member 2, the protruding part 32 of the rod member 3, and the inner circumferential stepped shaft portion 22 of the hollow shaft 2 forming a rotation transmitting structure, which conveys the rotation of the hollow shaft 2 to the rod member 3.

In the first embodiment, the rotary transmitting assembly 10 further comprises a bearing 4. The bearing 4 comprises two separated circular inner support parts 41A, 41B and one circular outer support part 42. The bearing 4, in accordance with a first embodiment, includes an axially lower inner support part 41A and an axially upper inner support part 41B with respect to first rotation axis A1. Preferably, the bearing 4 is formed as a four-point contact ball bearing having one single circular outer support part 42 and two separated circular inner support parts 41A, 41B, in particular the lower inner support part 41A and the upper inner support part 41B. However, the present invention is not limited thereto. While the bearing 4 illustrated has only one single circular outer support part 42, the bearing 4 may comprise two separated circular outer support parts 42 as needed and/or desired. Further, the bearing 4 may comprise a two-part ball bearing or a three-part ball bearing as needed and/or desired. For example, the bearing 4 may be formed as a deep groove ball bearing or a double row angular contact ball bearing, as needed and/or desired.

As seen in FIG. 1, the lower support part 41A of the bearing 4 abuts the first outer circumferential stepped shaft portion 21A of the hollow shaft 2 in the axial direction. Further, the single circular outer support part 42 of the bearing 4 abuts a bearing surface 11 (e.g., a bearing seat 11 of the housing 1) of the housing 1 in the axial and radial direction with respect to the rotation axis A1. The rotary transmitting assembly 10 further includes a stopper member 5 (e.g., a rod stopper 5), which is operatively fixed to the rod member 3. In the first embodiment, the stopper member 5 is clamped to the rod member 3 with screw members arranged inner side of the stopper member 5 and outer side of the end of the rod member 3 (i.e., a screw type rod stopper). However, the stopper member 5 can be arranged on the rod member 3 by other means as needed and/or desired. As can be seen in FIG. 1, a part of the stopper member 5 abuts a part of the upper inner support part 41B of the bearing 4, in particular, the lower side of the upper inner support part 41B in the axial and radial direction with respect to the first rotation axis A1. Accordingly, the four-point contact ball bearing 4 rotatably supports the rod member 3 and the hollow shaft 2 on the housing 1 in a radial and axial direction. Accordingly, when the hollow shaft 2 and the rod member 3 are disposed into the housing 1 via the bearing 4, the stopper member 5 is equipped on the rod member 3 and is screwed onto the rod member 3, whereby the rod member 3 and the hollow shaft 2 are together rotatably supported on the bearing 4 in the axial and radial direction. When the stopper member 5 is screwed on the rod member 3, the stopper member 5 only abuts the upper inner support part 41B of the bearing 4 without contacting the upper inner support part 41B nor the hollow shaft 2. Thereby, a gap is formed between the stopper member 5 and the end portion of the hollow shaft 2. With receiving the upper inner support part 41B of the bearing 4 by the stopper member 5 and with receiving the lower inner support part 41A of the bearing 4 by the first outer circumferential stepped shaft portion 21A, the rod member 3 is axially fixed against the hollow shaft 2 in a lower position. Thus, the axial runout can be reduced. This axial locking arrangement further enables that the movement of the rod member 3 in an axial direction is prevented. Hence, a secured axial positioning of the hollow shaft 2 and the rod member 3 can be achieved.

In the first embodiment, the rotary transmitting assembly 10 further comprises a circular bearing holding member 6 (e.g., a plug screw 6). The circular bearing holding member 6 is securely fixed to an inner surface 12A of an opening portion 12 of the housing 1. In first embodiment, the inner surface 12A has a female thread (not shown) in which a male thread (not shown) of the circular bearing holding member 6 is clamped. However, the present invention is not limited thereto, the circular bearing holding member 6 and the inner surface 12A can be engaged by other means, as needed and/or desired. In the first embodiment, the circular bearing holding member 6 is screwed to the opening portion 12 of the housing 1 until a lower surface 62 of the surface the circular bearing holding member 6 abuts the circular outer support part 42 of the bearing 4 in the axial direction with respect to the first rotation axis A1. An outer diameter of the circular bearing holding member 6 is larger than an outer diameter of the circular outer support part 42 of the bearing 4 in the radial direction with respect to the first rotation axis A1. As can be seen in FIG. 1, the housing 1 has a cylindrical portion 14 and at least one stepped housing section 13 located at a bottom end of the housing 1. The stepped housing section 13 inwardly extends from the end of the cylindrical portion 14 in a radial direction. The at least one bearing 4 is arranged in the manner where an axial end surface of the at least one bearing 4 is positioned between the outer surface of the at least one stepped housing section 13 and the inner surface of the at least one stepped housing section 13. By providing the above housing structure, enough thickness of the housing 1 allows to sustain the bearing 4 in the radial direction.

The circular bearing holding member 6 further comprises at least one sealing element (e.g., a gasket packing), which is arranged inside of the circular bearing holding member 6 for secure sealing purpose. In the first embodiment, after the circular bearing holding member 6 is clamped to the inner surface 12A of the opening portion 12 of the housing 1 with screw members and abutting the circular outer support part 42 of the bearing 4 in the axial direction for sustaining the bearing 4 in the axial direction, at least one part of the circular bearing holding member 6 is swaged or crimped to at least one part of the opening portion 12 of the housing 1 for securely fixing the circular bearing holding member 6 to the bearing 4. In particular, the circular bearing holding member 6 has a concave portion 61A, which is inwardly depressed in the axial direction, on an axially upper surface 61 and a convex portion 62A on the lower surface 62. A tool engaging hole 63 (i.e., tool engagement) is arranged on the concave portion 61A of the circular bearing holding member 6 for providing engagement with special tools, for example, a screw wrench. After the circular bearing holding member 6 is fixed to the housing 1 and the at least one part of the circular bearing holding member 6 is swaged or crimped to the housing, the convex portion 62A on the lower surface 62 of the circular bearing holding member 6 is arranged in the deeper area than the deformed portion of the circular bearing holding member 6 swaged or crimped to the housing 1. By providing the above structure of the circular bearing holding member 6, the circular bearing holding member 6 is securely fixed to the housing 1 without looseness and the stress from the swag/crimp/deformation can escape to the convex side of the circular bearing holding member 6. Therefore, the circular bearing holding member 6 securely locks the bearing 4. Further, by providing the above structure of the circular bearing holding member 6, this structure is flexible with respect to dimension tolerances of the bearing 4 and the housing 1.

A device 100 for converting rotary motion to linear motion in accordance with a second embodiment will be described below referring to FIG. 1. The device 100 comprises the same configuration as the rotary transmitting assembly 10 except for additional components of a stator 7, a plurality of magnets 8, and a ball nut 9. Thus, elements having substantially the same function as those in the first embodiment will be numbered the same here, and will not be described and/or illustrated again in detail here for the sake of brevity.

As seen in FIG. 1, the device 100 for converting rotary motion to linear motion in accordance with a second embodiment additionally comprises a stator 7 with a plurality of coils 71, which are arranged in a circumferential direction on the inner surface of the stator 7. The stator 7 is fixedly disposed on the cylindrical portion 14 of the housing 1. Further, a plurality of magnets 8 are fixedly disposed on a circumferential outer surface 23 of the hollow shaft 2 inwardly from the stator 7 in a radial direction with respect to the rotation axis A1. The hollow shaft is made from magnetic materials. Therefore magnetic flux generated from one of the magnets 8 passes through the hollow shaft 2 and flows to another magnets 8. That is, the hollow shaft 2 can be used as a magnetic path. An axial length of magnets 8 and an axial length of a magnet receiving portions 2A of the hollow shaft 2 on which the magnets are disposed are the same length and the hollow shaft 2 is stepped inwardly at the end of the magnet receiving portion 2A. In case the axial length of the magnet receiving portion 2A is longer than that of the magnets 8, the flux from the one of the magnets can easily diffused by passing through the longer portion of the hollow shaft 2. This results in ineffective flux circuit. So the same axial length of the magnets 8 and the magnet receiving portions 2A can achieve the best efficiency. A ball nut 9 is rotatably supported on a plurality of spiral grooves 33 on an outer circumferential periphery of the rod member 3. By providing the above rotary transmitting assembly 10, the rotation of the hollow shaft 2 is transmitted via the above rotation transmitting structure to the rod member 3. By providing the device 100, the rotary motion of the hollow shaft 2 and rod member 3 is converted to linear motion of the ball nut 9. Thus, the ball nut 9 moves on the rod member 3 back and forth in an axial direction, as needed and/or desired. Since the ball nut 9 moves back and forth in an axial direction, thus, the bearing 4 is under a high load in the axial direction of the rod member 3. Because the stopper member 5 receives the upper inner support part 41B of the bearing 4 and the first outer circumferential stepped shaft portion 21A, receives the lower inner support part 41A of the bearing 4, the axial runout is reduced. This axial locking arrangement further enables that rod member movement in an axial direction is prevented.

A motor in accordance with a third embodiment will be described below referring to FIG. 1. The motor has substantially the same configuration as the device 100 for converting rotary motion to linear motion. Thus, elements having substantially the same function as those in the above embodiments will be numbered the same here, and will not be described and/or illustrated again in detail here for the sake of brevity. The motor comprises the device 100 for converting rotary motion to linear motion including the above elements. By providing the above structure, the motor can achieve enough strength against the force in a radial and axial direction of the rotating parts. With a further aspect, the motor may be configured as a braking system motor (brake motor).

Figure 2:
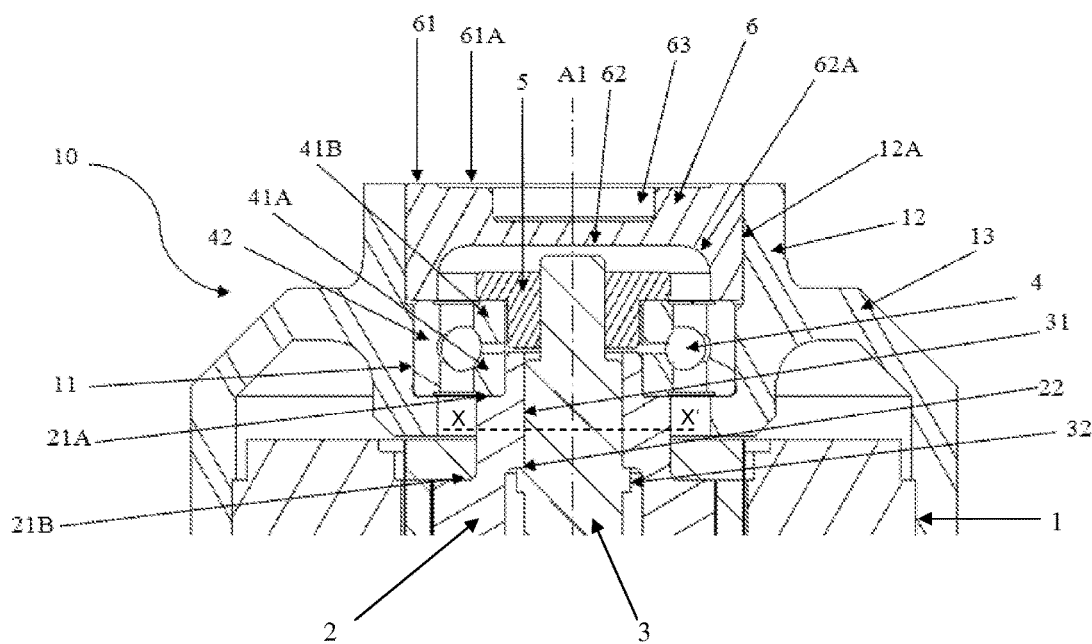
FIG. 2 is an enlarged cross sectional view of the rotary transmitting assembly illustrated in FIG. 1.

Now mainly referring to the FIGS. 2 and 3A to 3D. As can be seen in FIG. 2, the rotary transmitting assembly 10 is illustrated, which comprises the same configuration as the rotary transmitting assembly 10 in accordance with the first embodiment of the present invention. Thus, elements having substantially the same function as those in the first embodiment will be numbered the same here, and will not be described and/or illustrated again in detail here for the sake of brevity. FIG. 2 is an enlarged cross sectional view of the rotary transmitting assembly 10 illustrated in FIG. 1, showing a center section line X-X' with respect to the rotation transmitting structure, which conveys the rotation of the hollow shaft 2 to the rod member 3. As can be seen in FIG. 2, in particular at center section line X-X', the contacting portion of both the hollow shaft 2 and the rod member 3 corresponds to each other. Thus, the rotation of the hollow shaft 2 is transmitted to the rod member 3. The rod member 3 may have a shape different to a circular shape, as can be seen in the FIGS. 3A to 3D.

Figure 3A:
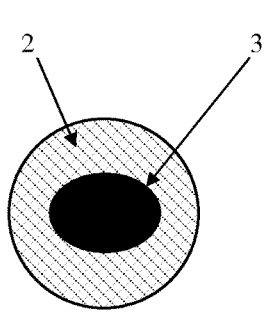
FIG. 3A is a partial cross sectional view of a hollow shaft and a rod member of the rotary transmitting assembly as seen along center section line X-X' of FIG. 2, wherein the rod member has an ellipse shape.

Now referring to FIGS. 3A to 3D showing rotation transmitting structure patterns. FIG. 3A shows a partial cross sectional view of the hollow shaft 2 and the rod member 3 of the rotary transmitting assembly 10 as seen along center section line X-X' of FIG. 2, wherein the rod member 3 has an ellipse shape and the contacting portion of the hollow shaft 2 corresponds thereto.

Figure 3B:
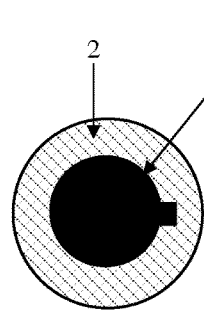
FIG. 3B is a partial cross sectional view of the hollow shaft and the rod member of the rotary transmitting assembly as seen along center section line X-X' of FIG. 2, wherein the rod member has a shape including a convex portion.

FIG. 3B shows a partial cross sectional view of the hollow shaft 2 and the rod member 3 of the rotary transmitting assembly 10 as seen along center section line X-X' of FIG. 2, wherein the rod member 3 has a shape including a convex portion and the contacting portion of the hollow shaft 2 corresponds thereto.

Figure 3C:
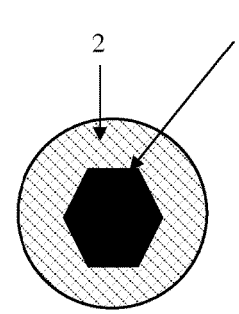
FIG. 3C is a partial cross sectional view of the hollow shaft and the rod member of the rotary transmitting assembly as seen along center section line X-X' of FIG. 2, wherein the rod member has an polygonal shape.

FIG. 3C shows a partial cross sectional view of the hollow shaft 2 and the rod member 3 of the rotary transmitting assembly 10 as seen along center section line X-X' of FIG. 2, wherein the rod member 3 has an polygonal shape and the contacting portion of the hollow shaft 2 corresponds thereto.

Figure 3D:
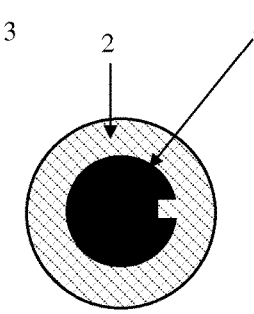
FIG. 3D is a partial cross sectional view of the hollow shaft and the rod member of the rotary transmitting assembly as seen along center section line X-X' of FIG. 2, wherein the rod member has a shape including a concave portion.

FIG. 3D shows a partial cross sectional view of the hollow shaft 2 and the rod member 3 of the rotary transmitting assembly 10 as seen along center section line X-X' of FIG. 2, wherein the rod member 3 has a shape including a concave portion and the contacting portion of the hollow shaft 2 corresponds thereto.

As seen in FIG. 1, inside of the end of the hollow shaft 2 has a stepped end 81 so that a sensor yoke 82 can be arranged onto the stepped end 81. In this embodiment, the sensor yoke 82 is formed to be a hollow annular shape and has two cylindrical portions, a first cylindrical portion 83 (an upper portion) and a second cylindrical portion 84 (a lower portion) and from the end of the second cylindrical portion 84, a plate portion 85 extends outwardly in a circumferential direction of the second cylindrical portion 84. A sensor magnet can be disposed on the plate portion 85. The first cylindrical portion 83 is press-fit into the stepped end 81 and fixed to the hollow shaft 2. And a rotation inspector (such as a Hall IC etc.) arranged in an axial direction of the plate portion 85 (not shown in the drawings) can detect the rotation of the sensor yoke 82 and then the rotation of the hollow shaft 2 is precisely detected to achieve accurate rotation control. Such accurate rotation control is useful for the control of brake systems where necessary pressures in brake pads are required to generate according to necessary brake strengths.

At the end of the ball nut 9, brake systems are disposed and are moved back and force according to the rotation of the hollow shaft 2. The radial length of the second cylindrical portion 84 can be adjusted according to the radial length of the brake systems. And in this case, because sufficient thickens of the hollow shaft 2 is secured to achieve sufficient strength of the hollow shaft 2. And the sensor yoke 82 extends from the inside of the hollow shaft 2, the outer surface of the hollow shaft 2 can be used only for fixing magnets 8 without extending the axial length of this rotary transmitting assembly 10. Because of this arrangement, the rotary transmitting assembly 10 can be compact in an axial direction with sufficient strength.

From the above description, those skilled in the art may perceive improvements, changes, and modifications. Such improvements, changes, and modifications within the skill in the art are intended to be covered by the appended claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

REFERENCE NUMBER LIST 1 housing
2 hollow shaft
2A magnet receiving portion
3 rod member
4 bearing
5 stopper member
6 circular bearing holding member
7 stator
8 magnets
9 ball nut
10 rotary transmitting assembly
11 bearing surface
12 opening portion
12A inner surface
13 stepped housing section
14 cylindrical portion
21A first outer circumferential stepped shaft portion
21B second outer circumferential stepped shaft portion
22 inner circumferential stepped shaft portion
23 circumferential outer surface
31 contacting portion
32 protruding part
33 spiral grooves
41A, 41B circular inner support parts
41A lower inner support part
41B upper inner support part
42 circular outer support part
61 upper surface
61A concave portion
62 lower surface
62A convex portion
63 tool engaging hole
71 coils
81 stepped end
82 sensor yoke 83 first cylindrical portion
84 second cylindrical portion
85 plate portion
100 device for converting rotary motion to linear motion

What is claimed is:

1. A rotary transmitting assembly comprising:
    a housing having a bearing surface that sustains at least one bearing;
    a hollow shaft coupled to the housing rotatably around a first rotation axis, wherein the hollow shaft has at least one outer circumferential stepped shaft portion and at least one inner circumferential stepped shaft portion;
    a rod member coupled to the housing rotatably around the first rotation axis having at least one contacting portion and at least one protruding part, wherein the at least one contacting portion contacts at least a part of the hollow shaft in a radial direction and the at least one protruding part abuts the at least one inner circumferential stepped shaft portion in an axial direction;
    the at least one bearing comprising at least one circular inner support part and at least one circular outer support part supporting the hollow shaft and the rod member to the housing rotatably around the first rotation axis, wherein the at least one circular inner support part abuts at least a part of the at least one outer circumferential stepped shaft portion in the axial direction and the at least one circular outer support part abuts the bearing surface of the housing in the axial direction; and
    a stopper member fixed to the rod member, wherein the stopper member abuts the at least one circular inner support part in the axial direction.

2. The rotary transmitting assembly according to the claim 1, further comprising:
    a circular bearing holding member fixed to an inner surface of an opening portion of the housing and configured to abut at least a part of the at least one circular outer support part in the axial direction.

3. The rotary transmitting assembly according to the claim 2, wherein an outer diameter of the circular bearing holding member is larger than an outer diameter of the at least one circular outer support part in a radial direction.

4. The rotary transmitting assembly according to the claim 2, wherein the circular bearing holding member having a concave portion on an upper surface of the circular bearing holding member and a convex portion on a lower surface of the circular bearing holding member, wherein the concave portion has a tool engaging hole.

5. The rotary transmitting assembly according to the claim 2, wherein the housing has at least one stepped housing section, wherein the at least one bearing is arranged in the manner where an axial end surface of the at least one bearing is positioned between an outer surface of the at least one stepped housing section and the inner surface of the at least one stepped housing section.

6. The rotary transmitting assembly according to the claim 1, wherein the at least one bearing is a four-point contact bearing, wherein the circular inner support part has a lower inner support part abutting the at least one outer circumferential stepped shaft portion and an upper inner support part abutting the stopper member.

7. The rotary transmitting assembly according to the claim 2, wherein the at least one bearing is a four-point contact bearing, wherein the circular inner support part has a lower inner support part abutting the at least one outer circumferential stepped shaft portion and an upper inner support part abutting the stopper member.

8. The rotary transmitting assembly according to the claim 6, wherein the at least one bearing is a four-point contact bearing, wherein the circular inner support part has a lower inner support part abutting the at least one outer circumferential stepped shaft portion and an upper inner support part abutting the stopper member.

9. The rotary transmitting assembly according to the claim 1, wherein at least one portion of the hollow shaft corresponds to the shape of the at least one contacting portion of the rod member.

10. The rotary transmitting assembly according to the claim 2, wherein at least one portion of the hollow shaft corresponds to the shape of the at least one contacting portion of the rod member.

11. The rotary transmitting assembly according to the claim 7, wherein at least one portion of the hollow shaft corresponds to the shape of the at least one contacting portion of the rod member.

12. The rotary transmitting assembly according to the claim 9, wherein the at least one contacting portion of the rod member has a shape different to a circular shape.

13. The rotary transmitting assembly according to the claim 9, wherein the at least one contacting portion of the rod member has at least either one of a polygonal shape, an ellipse shape, or a shape with a concave section and/or convex section.

14. The rotary transmitting assembly according to the claim 10, wherein the at least one contacting portion of the rod member has at least either one of a polygonal shape, an ellipse shape, or a shape with a concave section and/or convex section.

15. A device for converting rotary motion to linear motion, comprising:
    a housing having a bearing surface that sustains at least one bearing;
    a stator with a plurality of coils arranged in a circumferential direction, wherein the stator is disposed on a cylindrical portion of the housing;
    a hollow shaft coupled to the housing rotatably around a first rotation axis, wherein the hollow shaft has at least one outer circumferential stepped shaft portion and at least one inner circumferential stepped shaft portion;
    a plurality of magnets disposed on a circumferential outer surface of the hollow shaft inwardly from the stator in a radial direction;
    a rod member coupled to the housing rotatably around the first rotation axis having at least one contacting portion and at least one protruding part, wherein the at least one contacting portion contacts at least a part of the hollow shaft in a radial direction and the at least one protruding part abuts at least one inner circumferential stepped shaft portion in an axial direction;
    the at least one bearing comprising at least one circular inner support part and at least one circular outer support part supporting the hollow shaft and the rod member to the housing rotatably around the first rotation axis, wherein the at least one circular inner support part abuts the at least a part of the at least one outer circumferential stepped shaft portion in the axial direction and the at least one circular outer support part abuts the bearing surface of the housing in the axial direction;
    a stopper member fixed to the rod member, wherein the stopper member abuts the at least one circular inner support part in the axial direction; and
    a ball nut rotatably supported on spiral grooves on an outer circumferential periphery of the rod member, wherein the ball nut moves in the axial direction of the first rotation axis in accordance with rotation of the rod member.

16. A motor comprising a device for converting rotary motion to linear motion according to claim 15.

17. A motor according to claim 16, wherein the motor is configured as a braking system motor.

* * * * *